(12) United States Patent
Harlin et al.

(10) Patent No.: US 12,435,160 B2
(45) Date of Patent: Oct. 7, 2025

(54) SEPARATION OF POLYCOTTON BLENDS

(71) Applicant: Infinited Fiber Company Oy, Espoo (FI)

(72) Inventors: Ali Harlin, Espoo (FI); Sakari Siren, Espoo (FI); Jani Mäkelä, Espoo (FI)

(73) Assignee: Infinited Fiber Company, Espoo (FI)

( * ) Notice: Subject to any disclaimer, the term of this patent is extended or adjusted under 35 U.S.C. 154(b) by 180 days.

(21) Appl. No.: 17/910,377

(22) PCT Filed: Mar. 9, 2021

(86) PCT No.: PCT/FI2021/050171
§ 371 (c)(1),
(2) Date: Sep. 9, 2022

(87) PCT Pub. No.: WO2021/181007
PCT Pub. Date: Sep. 16, 2021

(65) Prior Publication Data
US 2023/0132641 A1    May 4, 2023

(30) Foreign Application Priority Data
Mar. 9, 2020  (FI) ..................................... 20205250

(51) Int. Cl.
| | | |
|---|---|---|
| *C08B 15/06* | (2006.01) | |
| *C08B 16/00* | (2006.01) | |
| *D01F 2/02* | (2006.01) | |
| *D21C 5/00* | (2006.01) | |
| *D21C 9/00* | (2006.01) | |

(52) U.S. Cl.
CPC .............. *C08B 15/06* (2013.01); *C08B 16/00* (2013.01); *D01F 2/02* (2013.01); *D21C 5/00* (2013.01); *D21C 9/002* (2013.01)

(58) Field of Classification Search
CPC ........... C08B 1/00; C08B 15/06; C08B 16/00; D21C 5/00; D21C 9/002; D01F 2/00; D01F 2/02; Y02W 30/62
See application file for complete search history.

(56) References Cited

U.S. PATENT DOCUMENTS

| | | | |
|---|---|---|---|
| 2,264,229 | A | 11/1941 | Wallach |
| 2,335,126 | A | 11/1943 | Lilienfeld |
| 4,345,039 | A | 8/1982 | Cowan et al. |
| 7,662,953 | B2 | 2/2010 | Valta et al. |
| 8,066,903 | B2 | 11/2011 | Valta et al. |
| 2006/0020126 | A1* | 1/2006 | Kopesky .................. C08B 15/02 536/30 |
| 2008/0306255 | A1 | 12/2008 | Ouchi et al. |
| 2008/0308492 | A1* | 12/2008 | Siegle ..................... B01D 39/18 210/508 |
| 2015/0225901 | A1* | 8/2015 | Asikainen .............. D21H 11/14 162/14 |
| 2015/0337485 | A1* | 11/2015 | Lee .......................... D04H 1/42 8/111 |
| 2017/0145119 | A1 | 5/2017 | Saxell et al. |
| 2019/0218362 | A1 | 7/2019 | Barla et al. |

FOREIGN PATENT DOCUMENTS

| | | | | |
|---|---|---|---|---|
| CA | 2141458 | A1 * | 8/1996 | ............... D21C 5/02 |
| CL | 201903059 | A | 3/2020 | |
| CN | 101260569 | A | 9/2008 | |
| CN | 104928930 | A | 9/2015 | |
| CN | 110785436 | A | 2/2020 | |
| DE | 4425237 | A1 | 1/1996 | |
| EP | 3511448 | A1 | 7/2019 | |
| FI | 20175376 | A1 * | 10/2018 | ............... C08B 1/00 |
| TW | 201940769 | A | 10/2019 | |
| WO | WO2010124944 | A1 | 11/2010 | |
| WO | WO2013124265 | A1 | 8/2013 | |
| WO | WO2014041251 | A1 | 3/2014 | |
| WO | WO2014162062 | A1 | 10/2014 | |
| WO | WO2015198218 | A1 | 12/2015 | |
| WO | WO2017019802 | A1 | 2/2017 | |
| WO | WO2018073177 | A1 | 4/2018 | |
| WO | WO2018197756 | A1 | 11/2018 | |
| WO | WO2018213117 | A1 | 11/2018 | |
| WO | WO-2019110865 | A1 * | 6/2019 | ............... C08J 5/06 |
| WO | WO2020013755 | A1 | 1/2020 | |

OTHER PUBLICATIONS

USDA, Peracetic Acid Processing, Nov. 3, 2000, retrieved from: https://www.ams.usda.gov/sites/default/files/media/Peracetic%20Acid%20Technical%20Report%20Handling.pdf (Year: 2000).*

* cited by examiner

*Primary Examiner* — Abbas Rashid
*Assistant Examiner* — Elisa H Vera
(74) *Attorney, Agent, or Firm* — Laine IP Oy

(57) ABSTRACT

According to an example aspect of the present invention, there is provided a method of separating cellulosic fibres and non-cellulosic fibres from a mixed fibre textile material comprising cellulosic and non-cellulosic fibres. The method comprises mechanically disintegrating the textile material to open textile structures in the material, contacting the mechanically opened structures with an acid in a first chemical step, and contacting the mechanically opened structures with an alkaline in a second chemical step.

30 Claims, No Drawings

SEPARATION OF POLYCOTTON BLENDS

FIELD

The present invention relates to a method of separating cellulosic fibres and non-cellulosic fibres from a mixed fibre textile material comprising cellulosic and non-cellulosic fibres.

BACKGROUND

Currently almost all post-consumer textile waste is sent to incineration or landfills despite approximately 95% of textiles being recyclable. Only a small portion of pre-consumer waste is mechanically recycled. Since the beginning of 2016 disposing of used textiles as landfill has been prohibited in the European Union (EU). Thus, in EU countries, textiles and their raw materials that cannot be reused or recycled are typically burnt in energy production plants.

Naturally, recycling would be preferred. The clothing textile market is predominantly based on either cotton or polyester, both of which have an environmental impact. Cotton growing, for example, requires huge amounts of water as well as pesticides and artificial fertilizers. The global demand for cotton has seriously outgrown the planet's resources for producing virgin material. Therefore, it is essential that postconsumer textile waste is recycled. Processing textile materials to obtain reusable fibres is known, e.g. from WO2013/124265A1, which describes the regeneration of a cellulose containing material by dispersing and precipitation.

One process used in the recycling of cotton-based textile waste materials is described in WO2018/197756 in which the textile material is treated in an alkaline extraction and then further treated with an acid to cause at least a partial dissolution of the cotton-based textile material.

Another known technique utilized in recycling is the hydrolysis of the fibres. Typically, it is preceded by a mechanical removal of metals and hard polymer pieces, such as buttons and zippers. For example, WO2010/124944A1 discloses a process for the hydrolysis of cellulose.

The Lyocell process is a process in which cellulose is regenerated by dissolving a cellulosic starting material in a first generation ionic liquid, NMMO. Ioncell-F, developed from the lyocell process, is a regeneration process including a dissolution of the starting material using a recently developed ionic liquid as solvent (WO2014/162062A1). The BioCelSol process, in turn, utilizes an enzymatic treatment of the starting material. Both of these processes, however, focus on preparing textiles from wood.

The chemically separated fraction of cellulose fibres can subsequently be used for various purposes, including carbamation or spinning.

It is known from U.S. Pat. No. 7,662,953 how carbamate cellulose is manufactured from high quality virgin cellulose raw materials such as dissolving pulp. A multi-phase dissolution technique for carbamate cellulose is presented in U.S. Pat. No. 8,066,903, where it is taught how a low temperature is applied in the dissolution and how the solution is prepared by first wetting the mass in low diluted alkali and then in highly concentrated and strongly chilled alkali.

A separation method involving a combination of mechanical and chemical processes for the separation of cellulose fibres from a textile material comprising cellulose fibres and other fibre and non-fibre elements is described in EP 3 511 448 A1. In such a process, the textile materials are first shredded in order to remove larger non-fibre foreign bodies. The remaining fibre components are then mechanically treated to separate cellulose fibres from non-cellulose fibres before the cellulose fibres undergo a chemical treatment to remove any non-cellulose fibres still remaining on the cellulose fibres.

A process for the separation of the cellulosic part from a polyester and cellulose composition is described in international patent application publication WO 2020 013755 A1. The application describes a process for separation of the cellulosic part from a raw material composition comprising polyester and cellulose containing composition, a cellulosic composition obtainable from the process for separation, a mixture comprising polyester hydrolysis products obtainable from the process for separation, a pulp, a dissolving pulp, a paper pulp, a regenerated cellulosic fibres product, and a paper product. In the separation process a polyester/cellulose composition is contacted with a hydrolyzing liquor comprising an alkaline solution.

U.S. Pat. No. 4,345,039 discloses a method of recovering polyester fibres from polyester/cotton textile waste. In the method the mixed textile is treated with anhydrous HCl gas, which while not damaging to the polyester, degrades the cellulosic material to cellulosic powder and results in chlorinated hydrocarbons.

SUMMARY OF THE INVENTION

The invention is defined by the features of the independent claims. Some specific embodiments are defined in the dependent claims.

According to a first aspect of the present invention, there is provided a method of separating cellulosic fibres and non-cellulosic fibres from a mixed fibre textile material comprising cellulosic and non-cellulosic fibres. The method comprises the steps of mechanically disintegrating the textile material to open textile structures in the material, contacting the mechanically opened structures with an acid in a first chemical step, and contacting the mechanically opened structures with an alkaline in a second chemical step.

According to a second aspect of the present invention, there is provided a dissolving pulp type material obtainable a method of separating cellulosic fibres and non-cellulosic fibres from a mixed fibre textile material comprising cellulosic and non-cellulosic fibres. The method comprises the steps of mechanically disintegrating the textile material to open textile structures in the material, contacting the mechanically opened structures with an acid in a first chemical step, and contacting the mechanically opened structures with an alkaline in a second chemical step.

According to a third aspect of the present invention, there is provided a cellulose carbamate product obtainable by a method of separating cellulosic fibres and non-cellulosic fibres from a mixed fibre textile material comprising cellulosic and non-cellulosic fibres. The method comprises the steps of mechanically disintegrating the textile material to open textile structures in the material, contacting the mechanically opened structures with an acid in a first chemical step, and contacting the mechanically opened structures with an alkaline in a second chemical step.

Considerable benefits are gained with the aid of the present invention. A simple, easy to apply, inexpensive treatment, industrially applicable under moderate conditions separates cellulose from non-cellulosic elements of mixed-fibre textiles. The treatment can be carried out using existing infrastructure, e.g. the treatment may be carried out in pulp mills. The obtained cellulose is highly accessible to further chemical treatments, for example, carbamation.

Other features and advantages will become apparent from the following description.

EMBODIMENTS

For the purposes of the present invention, acidic treatment means a treatment that emulates the pre-hydrolysis conditions used in the manufacture dissolving pulp using, e.g. pre-hydrolysis kraft pulping technology.

Dissolving pulp type material is to be taken to mean a material obtained by means of embodiments of the method which is essentially chemically pure cellulose, which is free from non-cellulosic impurities such as pigments, inorganics, lignin, hemicelluloses, textile finishes and additives, as well as essentially free from non-cellulosic fibres. Essentially free from non-cellulosic fibres means that some inevitable impurities remain.

Sorting means that material is manually selected or mechanically selected according to its composition. The material is comprised of 50% by weight or more of the material of a main component, which is cellulose or cellulosic fibres. Sorting further comprises rejecting contaminated materials, based on visual or sensory observation, machine vision, spectral analysis, hyperspectral imaging or any other relevant composition detection method.

Starting weight of the textile material refers to the weight of the textile material after most non-textile elements such as labels and certain prints, metal elements, rubber elements, leather elements and plastic elements such as buttons and zippers have been removed. In other words, the starting weight of the textile material essentially refers to the weight of the cellulosic and non-cellulosic fibrous components only.

Alkaline treatment, in turn, means a treatment in which materials are contacted with an aqueous solution of alkaline or alkalines.

For the purposes of the present invention, when a temperature is measured it is measured at atmospheric pressure, unless stated otherwise.

It is an aim of the present invention to overcome at least some of the problems associated with the prior art and provide an improved method for the separation of cellulose from mixed-fibre textiles comprising cellulose fibres and non-cellulose fibres such as polyester, polyamide, polyurethane and so on and so forth in which method, after removal of foreign bodies such as buttons, zips and such like (refining of textile waste) and mechanical disintegration, degree of polymerization of cellulose is adjusted to a desired degree suitable for preparing a dissolving pulp type material by contacting the comminuted textile with acid. It has surprisingly been found that contacting a mass of mechanically disintegrated mixed fibre textile with acid removes non-cellulosic impurities such as metals and acid-soluble substances, e.g. pigments, surfactants and other organic residues present in the textile material. The acid stage initiates also cellulose hydrolysis beneficial to adjust the degree of polymerization of the cellulose to be suitable for the targeted application. The properties of these fragments are then adjusted in a second chemical step in which the acid-contacted mass is contacted with alkaline. Contacting the mass with alkaline swells the cellulose thus increasing activity for later dissolution. It has further been found that contacting the mass with alkaline is efficient in removing certain protein fibres, namely wool, animal hair, silk and protein, e.g. keratin. A certain portion of oligomeric cellulose is removed as well.

DETAILED DESCRIPTION

Embodiments of the present invention describe a method of separating cellulosic fibres and non-cellulosic fibres from a mixed fibre textile material comprising cellulosic and non-cellulosic fibres. In an embodiment textile materials are provided and sorted to remove any textiles that do not have a cellulosic content, and to remove fragments of metal such as buttons and zippers. This sorting may be carried out before the textiles are delivered to e.g. a pulp mill, or it may be carried out onsite, where the disintegration and separation of the blended textiles takes place, e.g. at a pulp mill. According to an embodiment the method comprises mechanically disintegrating the textile material to open textile structures in the material. The textile material can be disintegrated with various mechanical devices to provide disintegrated textile material pieces having a size in the region of 0.01 to 1.00 $cm^2$. In an embodiment the textile material is disintegrated by means of shredding, grinding, grating or milling the textile material to open textile structures in the material. In a further embodiment, the disintegrating by means of shredding, grinding, grating or milling the textile material opens the yarn structures in the material. Preferably, fibres having sizes up to 40 mm are obtained. Optimally, the textile material pieces are disintegrated into single particles having fibre length of ≤25 mm, preferably ≤10 mm, suitably 1 to 5 mm in length. The disintegration of the textile to these sizes provides fibres with surface areas of sizes optimal for contacting with liquids in subsequent chemical steps. As mentioned above, material is sorted to provide mixed fibre material comprising cellulose. In one embodiment, the mixed fibre textile material has a cellulose content of 50% by weight of the material or more, suitably 60% by weight of the material or more, particularly, 70% by weight of the material or more, preferably 80% by weight of the material, most preferably the mixed fibre textile material comprises 80% by weight of the material of cellulose and less than 20% of a non-cellulosic fibre, suitably the non-cellulosic fibre component is polyester. The material may further comprise other non-cellulosic components such as elastane, polyurethane, etc. The mechanically opened structures are contacted with an acid in a first chemical step to obtain acid-treated fibres. Contacting the mechanically opened structure with an acid provides a slurry or a bed of fibres. The acid acts on the cellulosic fibres adjusting the degree of polymerisation of cellulose, particularly decreasing the degree of polymerisation, e.g. in an embodiment from a maximum viscosity in the range of 500 to 2500 ml/g, preferably 600 to 1000 ml/g, more preferably 700 to 900 ml/g, particularly 800 ml/g to a minimum viscosity in the range of 200 to 500 ml/g, preferably 250 to 500 ml/g, suitably 250 to 450 ml/g, particularly 300 to 350 ml/g. In one embodiment the acid further acts on monomeric non-cellulosic and inorganic and organic components, dissolving said components for washing out in a subsequent step. When measuring viscosity of polycotton, only the cellulosic part is considered; the non-cellulosic part does not contribute to the viscocity. The acid-treated fibres are then contacted with an alkaline in a second chemical step. Contacting with an alkaline washes the non-cellulosic components from the slurry, to provide a slurry essentially comprising purified cellulosic fibres, although a small amount of non-cellulosics may remain. In a suitable embodiment, the acid-treated fibres are washed with water before they are contacted with the alkaline in the second chemical step. In one embodiment the acid-treated fibres are pressed prior to being contacted with the alkaline in the second chemical step. In a further embodiment the acidic cooking liquor from the first chemical step is displaced by an alkaline cooking liquor for the second chemical step.

In one embodiment mechanically disintegrating the textile material comprises shredding the textile material or grinding the textile material or shredding the textile material and grinding the shredded material. The shredding rate (i.e. physical fibre dimension, opening of yarn/fabric structures, fluffiness/bulk density of the material) of the sorted and refined textile waste has considerable impact on the behaviour of material in the chemical pre-treatment, as for the e.g. filling of digesters, slurry pumping and heat/mass transfer related properties. Typically, fibres having sizes up to 40 mm are obtained. Ideally, however, the textile material is ground and/or shredded until it comprises pieces having fibres of a size of ≤25 mm, preferably ≤10 mm, suitably 1 to 7 mm in length, for example 1 to 6, or 1 to 5 mm in length.

As mentioned above the mechanically treated pieces are then subjected to a first chemical step in an embodiment. The first chemical step comprises contacting the disintegrated textile material with an acid selected from the group consisting of mineral acids such as $H_2SO_4$, and persulphuric acid, organic acids such as formic acid, acetic acid, performic acid, peracetic acid, or acidic side streams of other industrial processes including pulpmill effluents and a mixture thereof. The mixture may comprise a combination of mineral acids, a combination of organic acids, a combination of peracids, or a combination of any of mineral acids, organic acids and peracids be they organic or inorganic. In a preferred embodiment, the disintegrated textile material is contacted with $H_2SO_4$. In one embodiment the initial acid charge is 2 to 30 g/l. In an embodiment the acid concentration at the end of the acid cooking was in the range 1 to 25 g/l. Various acids provide various benefits, e.g. oxidative acid, such as per acids improve dye removal, strong mineral acids improve acid hydrolysis. Organic acids on the other hand are biodegradable and further environmentally friendly in so far as sulphate emissions are kept at zero.

In a further embodiment the disintegrated textile material is contacted with the acid at a temperature in the range of 50 to 200° C., preferably 60 to 170° C., particularly 65 to 100° C., such as 60 to 95° C., suitably >70° C. As the temperature increases above 50° C. the rate at which degree of polymerization of cellulose decreases increases. The optimum range is between 50 and 100° C.

In a further embodiment wherein the disintegrated textile material is contacted with the acid for a period of 30 to 240 minutes, preferably 30 to 120 minutes, typically 40-90 minutes.

In addition to decreasing the degree of polymerization of the cellulose fraction the first chemical step provides the benefit of dissolving metals. Thus, in an embodiment the first chemical step comprises dissolving metals present in the disintegrated textile material, and initiating decrease of degree of polymerization (DP) of cellulose fraction. Once metals are dissolved, they may be washed out of the slurry in subsequent washing steps. In an embodiment the first chemical step further comprises dissolving further acid soluble impurities present in the disintegrated textile material for washing out of the slurry.

In a further embodiment the first chemical step comprises pumping the acid through the disintegrated textile material, e.g. the acid may be pumped through a bed of fibres whereby the mechanically opened textile fibres do not tumble together and do not form unopenable rope and knot structures, thus maintaining the accessibility of fibres to reagents in subsequent chemical processes. In a suitable embodiment the disintegrated textile material and the acid form a slurry that is mixed in a suitable reactor.

One type of suitable reactor is a mixing reactor, in which the fibres are mixed with the cooking liquor.

A further type of reactor can be a single digester or a set of digesters, in which the slurry formed by the fibre and cooking liquor (i.e. acidic or alkaline solution) is circulated by pumping. Another example of a set of reactors in which the slurry can be circulated is a medium consistency loop. Screw-type continuous reactors are also suitable for use in embodiments.

In each reactor pumpability of slurry is important when considering industrial applicability. Tumbling of the fibres together and rope formation can be avoided by the optimal disintegration of the raw material and/or optimization of pumping and mixing devices. In a particular embodiment the slurry is circulated in a suitable reactor by pumping.

Medium consistency is to be understood as describing a thick suspension of fibres, water and chemicals that is still transferable by means of, for the purpose, designed pumps. Typically, such suspensions can contain 3-15% of fibre, more often 6-12% of fibres, in the form of pulp or pulp derived from recycled cotton, Medium consistency may also be taken to describe a thick suspension of fibres, water and chemicals that is still transferable by means of, for the purpose, designed pumps. Typically, such suspensions can contain 3-15% of fibre, more often 6-2% of fibres, from recycled textiles.

For the purposes of the present invention "digester" is understood to be a vessel, either pressurized or not pressurized, where the fibre suspension is kept for a prolonged time in order for the intended chemical reactions to take place. The feed can be both to the top or bottom of the vessel and the discharge of the fibres can be enhanced by a discharge device. Such digesters can be equipped with internal screens for displacement of the liquor, while keeping the fibres within the digester. The vessels can be of both vertical and horizontal construction and be operated either batch wise or as continuously process.

In one embodiment, when operating at temperatures below or up to 100° C., for example during the acidic treatment, a non-pressurized vessel is used. In one embodiment, when operating at temperatures above 100° C., for example during alkaline treatment (cf. below), a pressurized vessel is used.

In an embodiment the method comprises a second chemical step. In one embodiment the second chemical step comprises contacting the acid-treated fibres with an alkali selected from the group consisting of NaOH, KOH, organic (non-ionic) superbases, and a mixture thereof. In a further embodiment, the alkali selected from the group consisting of NaOH, KOH, organic (non-ionic) superbases, and a mixture thereof is comprised in a sulphur containing cooking liquor from a traditional pulping process. In a particular embodiment superbases are an efficient catalyst for hydrolysis of non-cellulosics, such as polyesters. In one embodiment NaOH is used, optionally comprised in a sulphur containing cooking liquor from a traditional pulping process. One benefit of using NaOH is its ready availability in pulp mills. In an embodiment the initial charge of alkali is in the range of 25 to 100 g/l measured after neutralization of any acid residues remained in the acid treated material. Contacting the fibres with the alkali provides a number of effects. Firstly, the none cellulosic components, e.g. polymeric non-cellulosic components and keratin including wool, hair and skin residuals is washed from the cellulose and secondly the cellulose swells increasing accessibility to reagents for subsequent processes. Alkaline cooking continues the cellulose purification process in alkaline media in order to remove the major part of the colour pigments, remove polyester by alkaline hydrolysis, remove inorganics such as silica particles and adjust the molecular weight distribution of cellulose, initiated by the acidic treatment, to the target level for a subsequent carbamation process. In one embodiment the acid-treated fibres are contacted with the alkali at a temperature in the range of 50 to 200° C., preferably 95 to 140° C., typically 100 to 120° C., suitably 110° C. In a further embodiment the acid-treated fibres are contacted with the alkali for a period of 30 minutes to 240 minutes, typically 60 minutes to 180 minutes, preferably 60 minutes to 120 minutes. Wool, silk and animal hairs, or other keratins and scleroproteins are primarily separated already in the sorting and refining of textile waste. However, the presence of these fibres in the waste stream is acceptable. Removal of polyester by alkaline hydrolysis is one of the key effects of alkaline cooking for the chemical fibre separation. Additionally, degree of polymerization and molecular weight distribution of the cellulose fraction is adjusted. In an embodiment the viscosity of the textile raw material is in the range of 500 to 2500 ml/g, preferably 600 to 1000 ml/g, more preferably 700 to 900 ml/g, particularly 800 ml/g and the final viscosity after both the acid step and the alkaline step is 200 to 500 ml/g, preferably 250 to 500 ml/g, suitably 250 to 450 ml/g, particularly 300 to 350 ml/g.

In further embodiments a subsequent chemical bleaching of the acid and alkali cooked material is also possible. For example, in an embodiment total chlorine free bleaching using ozone and hydrogen peroxide/peracetic acid bleaching sequences is used to simultaneously adjust degree of polymerization of the cellulose fraction. In a further embodiment the ozone may be replaced with chlorine dioxide in case of an elemental chlorine free sequence to simultaneously adjust degree of polymerization of the cellulose fraction.

In practice, non-cellulosics such as polyurethane like elastane become brittle under thermal treatment after the first and second chemical steps, e.g. in carbamation and can be separated during dissolving and filtration of cellulose carbamate spinning dope.

In one embodiment the alkali is pumped through the acid-treated fibres, e.g. the alkali may be pumped through the bed of fibres whereby the acid-treated fibres do not tumble together and do not form unopenable rope and knot structures, thus maintaining the accessibility of the fibres to reagents in subsequent chemical processes. In a suitable embodiment the acid-treated fibre slurry and the alkali are mixed in a suitable reactor, such as those described above suitable for use in the first chemical step. In a particular embodiment the alkali slurry mixture is circulated in a suitable reactor or set of reactors by pumping.

In a further embodiment the second chemical step further comprises contacting the acid-treated fibres with a surfactant. In a suitable embodiment the second chemical step further comprises contacting the acid-treated fibres with a surfactant selected from the group of cationic surfactants, non-ionic surfactants and anionic surfactants, preferably with a non-ionic surfactant selected from the group consisting of alkyl polyglycoside, Cetomacrogol 1000, Cetostearyl alcohol, Cetyl alcohol, Cocamide DEA, Cocamide MEA, Decyl glucoside, Decyl polyglucose, Glycerol monostearate, IGEPAL CA-630, Isoceteth-20, Lauryl glucoside, Maltosides, Monolaurin, Mycosubtilin, Narrow-range ethoxylate, Nonidet P-40, Nonoxynol-9, Nonoxynols, NP-40, Octaethylene glycol monododecyl ether, N-Octyl beta-D-thioglucopyranoside, Octyl glucoside, Oleyl alcohol, PEG-10 sunflower glycerides, Pentaethylene glycol monododecyl ether, Polidocanol, Poloxamer, Poloxamer 407, Polyethoxylated tallow amine, Polyglycerol polyricinoleate, Polysorbate, Polysorbate 20, Polysorbate 80, Sorbitan, Sorbitan monolaurate, Sorbitan monostearate, Sorbitan tristearate, Stearyl alcohol, Surfactin, Triton X-100, Tween 80, sodium dodecyl sulphate (SDS), benzalkonium chlorides, benzyl C8-C18-alkyldimethylammonium chloride, any surfactant from similar material groups and a mixture thereof. Non-ionic surfactants are preferred as wetting agents. In one embodiment cationic surfactants such as benzyl-C8-18-alkyldimethylammonium chloride are preferred providing a strong interaction with the mixed textiles, such as polycotton, increasing the hydrophobicity of the mixture.

In one embodiment the second chemical step comprises contacting the acid treated fibres with ≤1.0 wt % surfactant by weight of the textile material, typically 0.05-0.5-wt % surfactant by starting weight of the textile material.

In one embodiment, the second chemical step is carried out using a single digester or a set of digesters of the kind discussed above in connection with the acidic treatment step, in which the slurry formed by the fibre and cooking liquor is circulated by pumping. As above, another example of a set of reactors in which the slurry can be circulated is a medium consistency loop. Screw-type continuous reactors are also suitable for use in embodiments.

In a further embodiment the acid and alkali-treated material is washed with water to provide an essentially cellulosic dissolving pulp type material for cellulose carbamate process.

In one embodiment, the mixed fibre textile material is a mixed-colour, mixed fibre textile material. The mixed fibre textile material, optionally exhibiting mixed colours and comprising cellulosic and non-cellulosic fibres is, in one embodiment, contacted with acid and alkali. In particular, the material is contacted separately with acid and alkali, for example first with acid and then with alkali or first with alkali and then with acid. Then, the material thus obtained is washed with water. Finally, the material is, in one embodiment, subjected to bleaching, in particular with ozone and optionally with ozone and with hydrogen peroxide.

In one embodiment, the acid and alkali-treated and subsequently ozone and optionally peroxide bleached material is washed with water to provide a cellulosic pulp material, in particular a cellulosic pulp material essentially of the dissolving pulp type, for the cellulose carbamate process.

Some textiles contain undesired dyes and colour pigments that may be removed in embodiments of the invention. In an embodiment the second chemical step further comprises removal of colour pigments, dyes and other alkali soluble impurities. In one embodiment colour pigments, dyes and other alkali soluble impurities are removed by hot caustic extraction in the second chemical step.

By means of embodiments of the method pulp may be obtained for use in further processes. In a particular embodiment a dissolving pulp type raw material is recovered for further processing. For example, the pulp may be recovered by filtering and drying. In one embodiment the alkaline dissolving pulp type raw material is neutralized before drying. In one embodiment the dissolving pulp type raw material is suitably dewatered and the formed web is dried in web or sheet form (the dried product can be collected either in roll or sheet form) for shipment. Drying by flash dryer or superheated steam dryer or spray drying or similar technology is also alternatively possible. In a further embodiment the dissolving pulp type raw material can be used directly as a wet pulp suitably dried for carbamation processes in an integrated mill. As mentioned above, in embodiments the whole process can be carried out in a pulp mill.

Further embodiments of the method provide a cellulose carbamate product. In an embodiment, the method comprises the further steps of contacting the acid and alkali-treated material with 5-25 wt % urea by weight of oven dry cellulose of the acid and alkali-treated material, reacting the material/urea mixture with mixing at a temperature in the range of 100 to 170° C., preferably, 130 to 165° C., suitably 133 to 150° C., to provide a cellulose carbamate product, recovering the cellulose carbamate product, and grinding the recovered product. In a further embodiment the recovered and ground cellulose carbamate product is optionally washed prior to dewatering or drying. In case the cellulose carbamate product is subsequently treated to separate any remaining non-cellulosics, the cellulose carbamate obtained from the carbamation process is first ground then purified prior to dewatering or drying. In one embodiment, degree of polymerization of the acid and alkali-treated material is adjusted with hydrogen peroxide during the carbamation process or with other suitable methods, e.g., by electron bombardment prior to the addition of urea. In an embodiment 29-435 mmol hydrogen peroxide per kilogram of acid and alkali-treated material is added. The degree of polymerization can alternatively be adjusted to the final target level within the chemical pre-treatment process (including or excluding the bleaching process).

Thus, by means of embodiments a cellulose carbamate product is provided from a mixed fibre textile material in one continuous process.

In some embodiments, not all of the non-cellulosic material is dissolved/removed during the first chemical step and the second chemical step. In an embodiment any remaining non-cellulosic material is separated by an additional two-phase extraction process from finely grounded cellulose carbamate material. In an alternative embodiment, the remaining non-cellulosic material is separated by filtration of dissolved cellulose carbamate prior to e.g. a wet spinning process. In a further embodiment remaining non-cellulosic material is separated in a gravitational separation, preferably by means of one or more hydrocyclones, i.e. a centrifugal separator and/or in a flotation cell. Cellulose (especially cotton) has a higher density than non-cellulosics such as polyester e.g. polyethylene terephthalate (PET), which in turn has a higher density than elastane. To improve the separation efficiency, several hydrocyclones can be connected in cascade. A mechanical separation of the fibre materials carried out according to an embodiment alternatively or additionally to the treatment in one or more hydrocyclones can also be carried out in a flotation cell. In a flotation cell, in particular the following procedures can be carried out: a) production of gas bubbles within the suspension b) bringing the gas bubbles into contact with the fibre materials from the suspension c) attaching or adhering the fibre materials to be separated to the gas bubbles d) allowing the gas/solid combinations to rise to a surface where they can be skimmed off due to their lower density, in the flotation cell, the lighter non-cellulosics such as polyester, e.g. PET and elastane particles will preferentially rise and may be skimmed off heavier cellulose particles, which remain in the flotation cell.

The described treatment in a flotation cell can be carried out continuously or batchwise.

The cellulose carbamate obtained as disclosed can be used as raw material for manufacturing of textile staple fibres or filaments, non-woven fibres, films, sponges and casings.

The following non-limiting examples illustrate at least some embodiments of the invention:

EXAMPLES

Example 1: Chemical Pre-Treatment in a Forced Circulation Digester

Recycled mixed colour sorted cotton textile waste with CED viscosity of 800±200 ml/g (modified ISO 5351) containing 4.0±2.8% of non-cellulosic fibres (mainly polyester, but also traces of nylon, isoprene containing material (elastic band), polyethylene/polypropylene) were mechanically shredded to disintegrate the fabric structure to form of pieces having fibres of a size of ≤25 mm. The shredded material (batch size: 135-155 kg of air dry shredded textile waste) was chemically pre-treated in the forced circulation digester using the two-stage cooking procedure: In the first acidic stage the shredded material were treated with sulphuric acid at 90° C. for 60 min, liquid to solid ratio of 10 to 1 was applied, initial acid charge was 5.4±0.4 g/l (n=35), final acid concentration in the end of cooking was 4.7±0.6 g/l (n=35), pH value of the final washing liquid was 6.4±1.2 (n=35) measured in wash filtrate by standing 1 kg of pre-treated pulp in 20 L of water for overnight. Average yield through acid stage was 88% solids on oven dried material in. In the second alkaline stage the washed acid treated material was chemically pre-treated with sodium hydroxide at 110° C. for 120 min, liquid to solid ratio of 13.5 to 1 was applied, initial alkali charge was 83±5 g/l (n=35), final alkali concentration in the end of cooking was 76±6 g/l (n=35), pH value of the final washing liquid was 8.3±0.5 (n=35) measured in wash filtrate by standing 1 kg of pre-treated pulp in 75 L of water for 1 h. Average yield through alkaline stage was 92% solids on oven dried material in. Viscosity of the chemically pre-treated material was 330±30 ml/g (n=35) (based on the CED viscosity measurement according to the ISO 5351, modified). The following elemental analysis (by using ICP-OES method after wet digestion of sample) including the ash content determination was carried out: Calcium content was 55±23 ppm as Ca (n=35), magnesium content was 6±3 ppm as Mg (n=35), iron content was 10±3 ppm as Fe (n=35), silicon content of 16±8 ppm as Si (n=35). Ash content was 0.10±0.03% (n=35) (ISO 1762).

The dissolving pulp type material obtained from pre-treatment process was suitably dewatered for the subsequent carbamation process. The carbamation process was carried out as described in Finnish patents FI112869, FI112795, and in Finnish patent application FI20195717. The degree of polymerization of cellulose was adjusted with hydrogen peroxide dosage of 0.33±0.08% (n=17) to the level of 248±17 ml/g (n=17) (as CED viscosity ISO 5351) measured in the washed and dried cellulose carbamate.

The cellulose carbamate obtained from carbamation process was further dissolved for production of cellulose carbamate fibres by the wet spinning process: The ground air dry cellulose carbamate powder was slurried and dissolved in sodium zincate (zinc oxane) solution to the target cellulose carbamate content of 6.5±0.2% (n=10), sodium hydroxide content of 6.5±0.2% (n=10). The cellulose carbamate dope obtained from the dissolving process was subsequently filtered using the two-stage backflush filtering process using the 20 μm filter media in the second filtration stage. Wet spinning of filtered and deaerated cellulose carbamate dope was carried out using the spin bath optimized for cellulose carbamate process containing e.g. sodium sulphate and free sulphuric acid. The applied godet stretching stress was 86±8% (n=56) under hot bath stretching conditions. The filament tow obtained from spinning was cut into staple fibres with cut length of 40 mm. The target filament titre was 1.3 dtex. Fibre tenacity at break measured from the staple fibres was 23±1 cN/tex (n=56) with the elongation at break of 16.4±1.5% (n=56) (SFS-EN ISO 5079).

Example 2: Chemical Pre-Treatment in a Mixing Reactor

Recycled mixed colour sorted cotton textile waste with CED viscosity of 800±200 ml/g (modified ISO 5351) containing 4.0±2.8% of non-cellulosic fibres (mainly polyester, but also traces of nylon, isoprene containing material (elastic band), polyethylene/polypropylene) were mechanically shredded to disintegrate the fabric structure to form of as possible intact fibres or yarn structures as possible.

For the acid stage, 178 kg of water was taken into a mixing reactor, 1.26 kg of sulphuric acid (93% solution w/w) was added and the diluted sulphuric acid solution was heated to 90° C. target temperature. While mixing mode was turned on 22.3 kg of air dry textile waste (dry matter content of 89.3%) was added into the reactor. Pulp consistency was 10% (w/w), the measured sulphuric acid content in the acidic cooking liquor was 6.5 g/l. The mixture was digested at 90° C. for 60 min. During the following 30 min period the reactor was suitably cooled down in order to exhaust the fibre slurry safely from the reactor. The acid treated fibre was divided into four batches and rinsed with water batch by batch until pH value of a wash effluent was approximately set to pH 6.

For the alkaline stage, 100 kg of water was taken into a mixing reactor, 34 kg of sodium hydroxide (50% solution w/w) was added and the diluted sodium hydroxide solution was heated to 50° C. 83.5 kg of acid treated washed wet fibre slurry containing 19.5 kg fibre was added into the reactor by mixing simultaneously. Pulp consistency was 9.0% (w/w), the initial measured sodium hydroxide charge was 84.8 g/l. The alkaline fibre slurry was heated to 100° C. during the following 140 min. After 100 min digestion at 100-107° C. the reactor was suitably cooled down during the following 100 min in order to exhaust the fibre slurry safely from the reactor, thus the total residence time of fibre in alkaline conditions above 50° C. was 340 min and above 100° C. for 100 min. The final sodium hydroxide concentration of the cooking liquor in the end of cooking was 106 g/l due to evaporation during the prolonged digestion.

Yield through acid and alkali stages was 83%. Viscosity of the chemically pre-treated material was 365 ml/g (based on the CED viscosity measurement according to the ISO 5351, modified).

The dissolving pulp type material obtained from pre-treatment process was suitably dewatered for the subsequent carbamation process. The degree of polymerization of cellulose was adjusted with hydrogen peroxide dosage of 0.4% to the level of 248 ml/g (as CED viscosity, ISO 5351) measured in the washed and dried cellulose carbamate. The carbamation process was carried out as described in Finnish patents FI112869, FI112795, and in Finnish patent application FI20195717. The total nitrogen content of the washed oven dried cellulose carbamate was 1.8% (SFS 5505:1988, modified).

Example 3: Chemical Pre-Treatment in a Digester

Recycled mixed colour sorted cotton textile waste with CED viscosity of 750 ml/g (modified ISO 5351) containing 8.8% of non-cellulosic fibres (mainly polyester and traces of nylon) were mechanically shredded to disintegrate the fabric structure into the form of pieces having fibres of an average size of 6 mm. The shredded material (batch size: 295 kg of air dry shredded textile waste) was acid pre-treated in a digester with a medium consistency loop designed for processing of medium consistency wood fibre based pulp. The main part of the loop consisted of a standpipe and a related medium consistency pump. In the first acidic stage, the shredded material was treated with sulphuric acid at 95 degrees Celsius for 70 min; a liquid to solid ratio of 10 to 1 was applied, the initial acid charge was 5.0 g/l, and the final acid concentration in the end of cooking was 4.3 g/l. The pH value of the final washing liquid was 3.2 measured in wash filtrate corresponding 0.6 g of free sulphuric acid per kilogram of dry acid treated material. The medium consistency pulp slurry in the acidic cooking liquor was circulated through a chemical mixer and returned to the top of the feed pipe. The flow in the loop was controlled by adjusting the speed of the pump and by bypassing the loop by directing part of the flow back to the lower part of the standpipe. The bypass was adjusted with a control valve suitable for fibre suspension. The viscosity of the acid treated material was 315 ml/g (based on the CED viscosity measurement according to the ISO 5351, modified). The average yield through acid stage was 78% solids on oven-dried material in.

In a second, alkaline stage the washed, acid treated material was chemically treated in a pressure reactor equipped with a medium consistency pump with sodium hydroxide at 110° C. for 120 min, liquid to solid ratio of 13 to 1 was applied, initial alkali charge was 71.7 g/l, final alkali concentration in the end of cooking was 63.7 g/l, pH value of the final washing liquid was 9.9 measured in wash filtrate by standing 1 kg of pre-treated pulp in 75 L of water for 1 h. The average yield through alkaline stage was 92% solids on oven dried material in. The viscosity of the acid-alkali treated material was 305 ml/g (based on the CED viscosity measurement according to the ISO 5351, modified).

Example 4: Ozone and Peroxide Bleaching of Acid and Alkali Treated Pulp

The washed acid-alkali treated material (prepared according to example no. 3) with an initial ISO brightness of 57.6 (ISO 2470) was subjected to ozone bleaching at the following process conditions: The pulp media was acidified with sulphuric acid to reach a sulphuric acid content of 0.45% by weight of dry cellulose, the pulp slurry consistency was adjusted to medium consistency level of 10% by weight, ozone dosage was 0.50% by weight of dry cellulose, and ozone bleaching was carried out at temperature of 60 degrees Celsius. The final pH was 2.1. 0.45% by weight of ozone of dry cellulose was consumed by bleaching reaction and ISO brightness was increased from 57.6 to 79.5 (ISO 2470), whiteness index was 72.8 and yellowness index was 2.7-2.9. The ozone bleached material was washed and subsequently subjected to hydrogen peroxide bleaching conditions in the following conditions: The pulp media was made alkaline with sodium hydroxide to reach a sodium hydroxide content of 0.3% by weight of dry cellulose. The consistency of the pulp slurry was adjusted to medium consistency level of 10% by weight, hydrogen peroxide dosage was 0.50% by weight of dry cellulose, hydrogen peroxide bleaching was carried out at temperature of 70 degrees Celsius for 90 minutes. pH was 9.1. 0.38% by weight of hydrogen peroxide of dry cellulose was consumed in bleaching reaction and ISO brightness was increased from 79.5 to 82.4 (ISO 2470), whiteness index was 79.0 and yellowness index was 0.8-1.1.

The dissolving pulp type material obtained from bleaching process was suitably dewatered for the subsequent carbamation process. The carbamation process was carried out as described in Finnish patents FI112869, FI112795, and in Finnish patent application FI20195717. The degree of polymerization of cellulose of the bleached material was 215 ml/g (ISO 5351) measured in the washed and dried cellulose carbamate. Hydrogen peroxide was not used in the carbamation process.

The cellulose carbamate obtained from carbamation process was further dissolved for production of cellulose carbamate fibres by the wet spinning process: The ground air dry cellulose carbamate powder was slurried and dissolved in sodium zincate (zinc oxane) solution to the target cellulose carbamate content of 7.0%, sodium hydroxide content of 6.5%. The cellulose carbamate dope obtained from the dissolving process was subsequently filtered using the 15 μm filter media in the second filtration stage. Wet spinning of filtered and deaerated cellulose carbamate dope was carried out using the spin bath optimized for cellulose carbamate process containing e.g. sodium sulphate and free sulphuric acid. The applied godet stretching stress was 80% under hot bath stretching conditions. The filament tow obtained from spinning was cut into staple fibres with cut length of 40 mm. The target filament titre was 1.3 dtex. Fibre tenacity at break measured from the staple fibres was >22 cN/tex with the elongation at break of 16.3±1.5% (SFS-EN ISO 5079).

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in the textiles industry in particular in recycling pre-consumer and post-consumer textile waste to provide dissolving pulp-type material for further processes used in the production of new textiles. Embodiments of the present invention are conveniently carried out in pulp mills, making use of current infrastructure and making use of the availability of waste chemicals from the pulp mills in the chemical separation steps described herein.

The invention claimed is:

1. A method for recycling cellulose from a mixed fibre textile material comprising cellulosic and non-cellulosic fibres, said method comprising:
    mechanically disintegrating the mixed fibre textile material by shredding, grinding, grating or milling the mixed fibre textile material to open textile structures in the material;
    contacting the disintegrated textile material with an acid in a first chemical step to obtain acid-treated fibres; and
    contacting the acid-treated fibres with an alkali in a second chemical step,
    wherein the acid is selected from the group consisting of $H_2SO_4$, persulphuric acid, formic acid, acetic acid, performic acid, an acidic side stream of an industrial process, and mixtures thereof, and
    wherein the first chemical step decreases the degree of polymerization of the cellulosic fibres by more than 10%.

2. The method according to claim 1, wherein the non-cellulosic fibres comprise polyester fibres.

3. The method according to claim 1, wherein the disintegrated textile material is contacted with the acid at a temperature in the range of 50 to 100° C.

4. The method according to claim 1, wherein the disintegrated textile material is contacted with the acid for a period of 30 to 240 minutes.

5. The method according to claim 1, wherein the first chemical step comprises dissolving metals present in the disintegrated textile material.

6. The method according to claim 1, wherein the first chemical step comprises mixing the acid and the disintegrated textile material into a slurry and circulating the slurry through one or more digesters by pumping.

7. The method according to claim 1, wherein the alkali is selected from the group consisting of NaOH, KOH, non-ionic organic superbases, and mixtures thereof.

8. The method according to claim 7, wherein the alkali comprises NaOH and the NaOH is in the form of a pulp mill cooking liquor.

9. The method according to claim 1, wherein the acid-treated fibres are contacted with the alkali at a temperature in the range of 50 to 200° C.

10. The method according to claim 1, wherein the acid-treated fibres are contacted with the alkali for a period of 30 minutes to 240 minutes.

11. The method according to claim 1, wherein the second chemical step comprises mixing the alkali and the acid-treated material into a slurry and circulating the slurry through one or more digesters by pumping.

12. The method according to claim 1, wherein the second chemical step further comprises contacting the acid-treated fibres with a surfactant.

13. The method according to claim 12, wherein the surfactant comprises a non-ionic surfactant.

14. The method according to claim 12, wherein the second chemical step comprises contacting the acid treated fibres with 0.05-1.0 wt % of the surfactant by starting weight of the textile material.

15. The method according to claim 1, further comprising washing the acid and alkali-treated material with water to provide an essentially cellulosic dissolving pulp type material for a cellulose carbamate process.

16. The method according to claim 15, further comprising subjecting the acid and alkali-treated material to ozone, or to ozone and hydrogen peroxide bleaching before or after the washing with water.

17. The method according to claim 1, wherein the second chemical step comprises removal of colour pigments, dyes, and other alkali soluble impurities.

18. The method according to claim 1, further comprising, after the first and second chemical step, recovering a dissolving pulp type raw material for further processing.

19. The method according to claim 1, wherein the mechanical disintegration step provides pieces having fibres of a size of ≤25 mm in length.

20. The method according to claim 1, further comprising the steps of:
drying the acid and alkali-treated material;
contacting the dried acid and alkali-treated material with 5-25 wt % urea by weight of the dried acid and alkali-treated material at a temperature in the range of 100 to 170° C. to provide a cellulose carbamate product; and
recovering the cellulose carbamate product.

21. The method according to claim 20, wherein the degree of polymerization of the acid and alkali-treated material is adjusted with hydrogen peroxide during the contacting of the dried acid and alkali-treated material with urea.

22. The method according to claim 20, wherein the degree of polymerization of the acid and alkali-treated material is adjusted by electron bombardment prior to the contacting with urea.

23. The method according to claim 20, further comprising grinding the recovered cellulose carbamate product and separating any non-cellulosic material from the ground recovered cellulose carbamate product by gravitational separation and/or in a flotation cell.

24. The method according to claim 20, further comprising producing cellulose carbamate fibers from the recovered cellulose carbamate product by a wet spinning process.

25. The method according to claim 20, further comprising dissolving cellulose carbamate in the recovered cellulose carbamate product in a solvent and thereafter filtering the solvent to remove remaining non-cellulosic material.

26. A cellulose carbamate product obtained by the method according to claim 20.

27. A dissolving pulp obtained by the method according to claim 1.

28. The method according to claim 1, wherein the first chemical step decreases the degree of polymerization of the cellulosic fibres by ⅙ or more.

29. A method for recycling cellulose from a mixed fibre textile material comprising cellulosic and non-cellulosic fibres, said method comprising:
subjecting the mixed fibre textile material to a mechanical process to provide a mechanically-treated material having cellulose and non-cellulose fibres having a size of ≤25 mm,
contacting the mechanically-treated material with an acid at a temperature of 50 to 200° C. to decrease a degree of polymerization of the cellulose by more than 10% in the mechanically-treated material, to reduce an amount of non-cellulosic components in the mechanically-treated material, and to provide an acid-treated material,
contacting the acid-treated material with an alkali at a temperature of 50 to 200° C. to provide an acid and alkali-treated material having a further reduced amount of non-cellulosic components and to swell an amount of cellulose in the acid and alkali-treated material,
drying the acid and alkali-treated material, and
contacting the acid and alkali-treated material with 5-25 wt % urea by weight of the dried acid and alkali-treated material at a temperature in the range of 100 to 170° C. to provide a cellulose carbamate product,
wherein the acid is selected from the group consisting of $H_2SO_4$, persulphuric acid, formic acid, acetic acid, performic acid, an acidic side stream of an industrial process, and mixtures thereof.

30. The method according to claim 29, wherein the degree of polymerization of the cellulose decreases by ⅙ or more.

* * * * *